United States Patent [19]

Puglia et al.

[11] 4,352,824

[45] Oct. 5, 1982

[54] CHEWING GUM CONTAINING FATTY OR GELATINOUS SWEETENER AND METHOD

[75] Inventors: Wayne J. Puglia, Bellerose Village; Gary Kehoe, South Salem; Frank Witzel, Spring Valley; K. Warren Clark, Brewster; Donald A. M. Mackay, Pleasantville, all of N.Y.

[73] Assignee: Nabisco Brands, Inc., New York, N.Y.

[21] Appl. No.: 295,334

[22] Filed: Aug. 24, 1981

Related U.S. Application Data

[63] Continuation of Ser. No. 134,401, Mar. 27, 1980, abandoned.

[51] Int. Cl.³ ............................................. A23G 3/30
[52] U.S. Cl. ................................... 426/5; 426/92; 426/103
[58] Field of Search ........................... 426/3-6, 426/103, 92

[56] References Cited

U.S. PATENT DOCUMENTS

| | | |
|---|---|---|
| 193,045 | 5/1877 | Sibley ............................ 426/3 |
| 969,458 | 9/1910 | Buck ............................. 426/3 |
| 1,771,506 | 7/1930 | Mustin .......................... 426/3 |
| 1,786,831 | 12/1930 | Dellenberger ................. 426/3 |
| 2,137,746 | 11/1938 | Wilson .......................... 426/3 |
| 2,306,415 | 12/1942 | Walker .......................... 426/3 |
| 3,632,358 | 1/1972 | Echeandia ..................... 426/3 |
| 3,995,064 | 11/1976 | Ehrgott ......................... 426/3 |
| 4,150,161 | 4/1979 | Rudolph ........................ 426/3 |
| 4,166,134 | 8/1979 | Witzel ........................... 426/3 |
| 4,186,214 | 1/1980 | Crouse et al. ................. 426/3 |
| 4,217,368 | 8/1980 | Witzel ........................... 426/3 |

*Primary Examiner*—Jeanette M. Hunter
*Attorney, Agent, or Firm*—Richard Kornutik

[57] ABSTRACT

A chewing gum is provided which contains gum base and a non-aqueous solid fatty or gelatinous sweetener or flavorant, such as butter, marshmallow or caramel, solubilized in the gum base. The subject chewing gum has the appearance and mouth feel of chewing gum as opposed to candy and a delayed but prolonged sweetness or flavor impact. The chewing gum is laminated with a slab of chewing gum which will supply initial sweetness or flavor impact.

A method for producing the above chewing gum is also provided.

8 Claims, No Drawings

CHEWING GUM CONTAINING FATTY OR GELATINOUS SWEETENER AND METHOD

This is a continuation of application Ser. No. 134,401, filed Mar. 27, 1980, now abandoned.

FIELD OF THE INVENTION

The present invention relates to a chewing gum which includes gum base having a non-aqueous solid fatty or gelatinous sweetener or flavorant, such as butter, marshmallow or caramel, solubilized therein, and which provides for delayed but prolonged sweetness or flavor impact, and to a method for preparing such chewing gum.

BACKGROUND OF THE INVENTION

One of the major objectives for chewing gum researchers has been the attainment of a chewing gum having long-lasting flavor and sweetness. Various approaches have been taken among which include use of powerful synthetic sweeteners, use of special forms of sweeteners, such as encapsulated sweeteners, and use of special techniques for incorporating sweeteners into the chewing gum.

Generally, the sweeteners employed in the above efforts are natural or synthetic, usually water-soluble, non-fatty, non-gelatinous sweeteners, which have been known for their use in chewing gums and provide an initial sweetness impact which at most times is too sweet for adult tastes.

U.S. Pat. No. 2,460,698 to Lindhe discloses a candy chewing gum prepared by mixing gum base with boiled sugar or candy in its hot liquid state to limit oxygen introduction into the gum base. The chewing gum product produced is said to be relatively breakable as compared to bendable and flexible chewing gum and initially has the taste and mouth effect of candy.

STATEMENT OF THE INVENTION

In accordance with the present invention, a chewing gum is provided which has a delayed but prolonged sweetness or flavor impact which is supplied by a unique sweetener or flavor delivery system, namely, non-aqueous solid fatty or gelatinous materials which are solubilized in the gum base. Initial sweetness or flavor impact may be provided by adding conventional natural or synthetic sweeteners or flavors to the gum base. In another aspect of the present invention, initial sweetness or flavor impact is provided by combining a separate pre-sweetened or pre-flavored layer or slab of chewing gum with the gum base containing the fatty or gelatinous material, for example, by lamination, co-extrusion or other conventional techniques.

The chewing gum of the invention which has long-lasting sweetness and flavor will thus include gum base and a relatively low melting, non-aqueous solid fatty or gelatinous sweetener or flavorant incorporated in the gum base. Such sweetener or flavorant melts upon contact with hot gum base and so is easily solubilized in the gum base to ensure bonding of the fatty or gelatinous sweetener or flavorant with the gum base. The chewing gum so-produced has the appearance and mouth feel of chewing gum both initially, during and after chewing. Furthermore, fatty or gelatinous sweetener or flavorant, such as marshmallow, provides a unique, continuous initial texture which, upon chewing breaks down to a conventional chew.

The relatively low melting non-aqueous solid or gelatinous sweetener or flavorant will generally have a melting point of below about 150° F., and preferably below about 110° F. so that it will easily melt in hot gum base, that is, gum base heated at 140° to 200° F. The gum base need not be in molten form to solubilize the sweetener or flavorant but only need be heated to the above-mentioned temperatures. Such sweetener or flavorant will be present in the gum base in an amount of within the range of from about 40 to about 350%, and preferably from about 50 to about 150% by weight of the gum base, and from about 8 to about 70%, and preferably from about 8 to about 40% by weight of the chewing gum piece, slab or section containing such sweetener or flavorant. Examples of such fatty or gelatinous sweeteners or flavorants suitable for use herein include, but are not limited to, marshmallow, caramel, butter, other fat proteins, chocolate, cocoa butter, lard, other animal fats, milk solids, coconut fat, vegetable fats or confectioner's coatings. These materials do not function as binders or sources of moisture and thus are not the equivalent of corn syrup, sorbitol syrup or other conventional moisturizers or binders. Furthermore, these materials are only slowly released from the gum base after about 15 to 20 seconds of chewing.

As indicated, in order to provide initial sweetness or flavor impact, the chewing gum of the invention may contain one or more natural or synthetic sweeteners.

Thus, when present, the chewing gum may include a sugar in an amount of from about 20 to about 80% by weight, and preferably, from about 25 to about 40% by weight. The chewing gum may include a sugar alcohol, in lieu of or in addition to the sugar, such as sorbitol, arabitol, mannitol or xylitol; the sugar alcohol may be present in an amount within the range of from about 2 to about 15% by weight, and preferably, from about 5 to about 12% by weight. Where an artificial sweetener is employed such as, for example, aspartame, cyclamate, or a saccharin or other sweetener as set out hereinafter, the artificial sweetener may be present in an amount of from about 0 to about 0.5% by weight, and preferably, from about 0.05 to about 0.2% by weight.

In addition, in order to provide for initial flavor or sweetness impact, that is, during the first 15 to 20 seconds of chewing, the chewing gum of the invention may be combined with one or more slabs of conventional chewing gum, for example, by a lamination or co-extrusion technique, to form a sandwich or concentric structure. Alternatively, the chewing gum of the invention may be coextruded with conventional type chewing gums so that such conventional gums surround, are swirled in and around or partially coat the chewing gum of the invention.

Examples of sugars which may be employed herein include, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose such as cane or beet sugar, lactose, maltose or cellobiose; polysaccharides, such as partially hydrolyzed starch or dextrin.

Examples of artificial sweeteners which may be employed herein include sodium, calcium or ammonium saccharin salts, free saccharin acid, dihydrochalcones, glycyrrhizin, dipotassium glycyrrhizin, glycyrrhizic acid ammonium salt, L-aspartyl-L-phenylalanine methyl ester (aspartame), the sodium or potassium salt of 3,4-dihydro-6-methyl-1,2,3-oxathiazine-4-one-2,2- dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I | |
| Ester gum | 88 |
| Rubber latex solids | 10 |
| Lecithin | 2 |
| Base II | |
| Chicle | 30 |
| Jelutong | 60 |
| Gutta soh | 8 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils which may also be employed in the chewing gum of the invention include acids such as adipic, succinic and fumaric acids, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the center fill.

The chewing gum may also contain conventional ester gums, polydextrose, fillers, such as calcium carbonate, and talc and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D.&C. coloring agents, and other conventional chewing gum additives as will be apparent to those skilled in the art.

In carrying out the method for preparing the chewing gum of the invention, the gum base is first melted; the melted gum base is then cooled to below about 200° F., and preferably below about 180° F., and from about 50 to about 350% by weight (based on the weight of the gum base) of the fatty or gelatinous sweetener is added and solubilized in the melted gum base. Thereafter, other conventional ingredients, such as softener, for example, lecithin, other sweetener, such as sugar and/or sorbitol, are added to form a chewing gum. If desired, solid flavor may be added and mixed with the gum base mix to form a chewing gum which may then be rolled, scored, cut into desired shapes and wrapped without the chewing gum sticking to the wrap.

In another aspect of the present invention, a soluble sugar, for example, sucrose, is made less soluble (or less readily soluble) through reaction with fat and protein substances, preferably via their initial incorporation (butter, fat, protein) into the gum base to entrap flavors as formed, and to ensure maximum bonding of sweet phase with gum base to obtain slow flavor release.

Thus, in one embodiment of the present invention, butter (or other fat plus protein) is dissolved into hot gum base heated at 140° F., to provide from about 40 to about 350% by weight butter based on the weight of the gum base. Sugar, in an amount from about 200 to about 350% by weight of the gum base, is added and the mixture is heated to about 180° F., so as to form caramel flavors and melanoidin substances of butterscotch type. The result is a chewing gum having unique texture and very long-lasting flavor due to caramel (toffee) substance now combined with the butter previously dissolved (dispersed) in the gum base and hence very slow to extract into saliva. A similar chewing gum product can be made by first starting the caramel (toffee, butterscotch, etc.) manufacture and then adding gum base at a later stage, or even by mixing previously made toffee, butterscotch, etc. with gum base or chewing gum.

Preferred chewing gum compositions in accordance with the invention are set out below.

| Ingredient | Parts by Weight | | |
|---|---|---|---|
| Gum base | 13 | to | 32 |
| Fatty or gelatinous sweetener or flavor | 10 | to | 40 |
| Softener (e.g. lecithin) | 0.1 | to | 1 |
| Sugar (or other bulking agent) | 40 | to | 75 |
| Liquid flavor | 0.5 | to | 1.5 |
| Other plasticizer | 0.2 | to | 2 |
| Liquid sorbitol (65 to 75% solids) | 0 | to | 18 |
| Color | 0 | to | 0.5 |

The following Examples illustrate a preferred embodiment of the present invention without, however, limiting the same thereto. All temperatures are expressed in °F.

EXAMPLE 1

Chewing gum having the following composition is prepared in accordance with the method of the invention as described below.

| Ingredient | Parts by Weight |
| --- | --- |
| Gum base | 19 |
| Marshmallow | 22.95 |
| Lecithin | 1.5 |
| Sugar, pulverized | 40 |
| Liquid sorbitol (70% solids) | 15 |
| Liquid flavor (fruit blend) | 1 |
| Spray dried flavor | 0.5 |
| Color | 0.05 |

The gum base is heated to 160°–175° F. and placed in a standard dough mixer equipped with sigma blades. The marshmallow is added and mixing and heating are continued for 4 minutes until the marshmallow is solubilized in the gum base. Lecithin is then added and mixed for 1 minute. Sugar and liquid flavor are then mixed with the gum base about 2 minutes. Thereafter, the sorbitol liquid is mixed with the mass for about 3 minutes to form a cohesive mass. The spray dried flavor is then mixed into the mass to form a chewing gum. The chewing gum mass is rolled, scored, and cut into desired shape.

The chewing gum product is found to have the appearance and mouth feel of chewing gum and a delayed but prolonged sweetness and flavor impact.

Upon combining the above chewing product with a slab of conventional chewing gum, a chewing gum laminate is produced which has good initial and prolonged sweetness and flavor.

EXAMPLE 2

A caramel flavored chewing gum having the following composition is prepared in accordance with the method of the invention as described below.

| Ingredient | Parts by Weight |
| --- | --- |
| Gum base | 19 |
| Butter | 14.95 |
| Lecithin | 1.5 |
| Sugar, pulverized | 48 |
| Liquid sorbitol (70% solids) | 15 |
| Liquid flavor (fruit blend) | 1 |
| Spray dried flavor | 0.5 |
| Color | 0.05 |

The gum base is melted and cooled to 110°–140° F. and placed in a standard dough mixer equipped with sigma blades. The butter is added and mixing and heating are continued for 4 minutes until the butter is solubilized in the gum base. Sugar is added and the mixture is heated to about 180° F. so that the sugar reacts with the butter in the gum base to form caramel flavors in the gum base. Lecithin is then added and mixed for 1 minute. Liquid flavor is then mixed with the gum base about 2 minutes. Thereafter, the liquid sorbitol is mixed with the mass for about 3 minutes to form a cohesive mass. The spray dried flavor is then mixed into the mass to form a chewing gum. The chewing gum mass is rolled, scored, and cut into desired shape.

The result is a chewing gum having unique texture and very long-lasting flavor due to caramel (toffee) substance now combined with the butter previously dissolved (dispersed) in the gum base and hence very slow to extract into saliva.

The chewing gum product is found to have the appearance and mouth feel of chewing gum and a delayed but prolonged sweetness and flavor impact.

Upon combining the above chewing product with a slab of conventional chewing gum, a chewing gum laminate is produced which has good initial and prolonged sweetness and flavor.

A similar chewing gum product can be made by first starting the caramel (toffee, butterscotch, etc.) manufacture and then adding gum base at a later stage, or even by mixing previously made toffee, butterscotch, etc. with gum base or chewing gum.

What is claimed is:

1. A laminated chewing gum having long-lasting sweetness and flavor, which comprises at least a first slab or layer of chewing gum including from about 13 to about 32% by weight of finished gum base consisting essentially of one or more natural gums, synthetic resins or mixtures thereof, ester gums, fillers and plasticizers, and a solid fatty or gelatinous flavor additive incorporated in and bonded with said finished gum base, said fatty or gelatinous flavor additive consisting essentially of marshmallow, caramel, butter, butter combined with sugar, chocolate, cocoa butter, lard, other fat protein, other animal fats, milk solids, coconut fat, vegetable fats, or confectioner's coatings, said fatty or gelatinous flavor additive being present in an amount of from about 40 to about 350% by weight of said gum base, or from about 8 to about 70% by weight of the chewing gum, said first slab or layer having the appearance and mouth feel of chewing gum as opposed to a candy, and providing a delayed but prolonged sweetness or flavor impact, and a second slab or layer of chewing gum combined with and bonded directly to said first slab or layer, said second slab or layer to provide initial sweetness or flavor impact.

2. The chewing gum as defined in claim 1 further including one or more natural or artificial sweeteners or flavors to provide initial sweetness or flavor impact.

3. The chewing gum as defined in claim 2 wherein said one or more sweeteners comprise sugar, sugar alcohols, or mixtures thereof.

4. The chewing gum as defined in claim 3 wherein said sugar is present in an amount of within the range of from about 0 to about 60% by weight of the chewing gum.

5. The chewing gum as defined in claim 2 wherein said artificial sweetener is free saccharin acid, sodium saccharin or calcium saccharin, or aspartame.

6. The chewing gum as defined in claim 1 wherein two slabs of chewing gum laminated to either side of said slab of said gum base containing said fatty or gelatinous sweetener or flavorant solubilized therein so as to provide a sandwich structure with said gum base-fatty or gelatinous sweetener or flavorant slab disposed intermediate said slabs of chewing gum.

7. A method for preparing the laminated chewing gum as defined in claim 1 which comprises melting a desired amount of said solid fatty or gelatinous flavor additive into said gum base to cause said fatty or gelatinous flavor additive to be dissolved in or at least comingled with said gum base, and mixing said gum base containing said fatty or gelatinous flavor additive with other chewing gum ingredients to form a first slab or layer of chewing gum, combining said first slab or layer of chewing gum with at least a second slab or layer of chewing gum and bonding the surface of said first slab directly to the surface of said second slab.

8. A method for preparing the laminated chewing gum as defined in claim 1 which comprises melting a desired amount of butter, mixing the melted butter into said gum base to cause said butter to be comingled with said gum base, adding sugar to said gum base and heating to cause reaction of said butter with said sugar to form caramel dissolved in said gum base, and mixing said gum base containing said caramel with other chewing gum ingredients to form a first slab or layer of chewing gum and combining said first slab or layer of chewing gum with at least a second slab or layer of chewing gum.

* * * * *